(12) United States Patent
Martini

(10) Patent No.: US 9,294,450 B2
(45) Date of Patent: Mar. 22, 2016

(54) SELECTIVELY PERFORMING MAN IN THE MIDDLE DECRYPTION

(71) Applicant: iboss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/845,209

(22) Filed: Sep. 3, 2015

(65) Prior Publication Data

US 2015/0381584 A1 Dec. 31, 2015

Related U.S. Application Data

(63) Continuation of application No. 14/682,019, filed on Apr. 8, 2015, now Pat. No. 9,148,407, which is a continuation of application No. 13/890,146, filed on May 8, 2013, now Pat. No. 9,021,575.

(51) Int. Cl.
*H04L 9/32* (2006.01)
*H04L 29/06* (2006.01)

(52) U.S. Cl.
CPC ........ *H04L 63/0428* (2013.01); *H04L 63/1441* (2013.01)

(58) Field of Classification Search
CPC ....... H01L 63/04; H01L 63/30; H01L 63/306; H01L 63/166; H01L 63/0227; H01L 9/321; H01L 67/02
See application file for complete search history.

(56) References Cited

U.S. PATENT DOCUMENTS

| 5,835,726 | A  | 11/1998 | Shwed et al. |
| 6,594,682 | B2 | 7/2003  | Peterson et al. |
| 6,742,047 | B1 | 5/2004  | Tso |
| 7,080,158 | B1 | 7/2006  | Squire |
| 7,516,485 | B1 | 4/2009  | Lee et al. |
| 7,606,214 | B1 | 10/2009 | Sekhar et al. |
| 7,761,594 | B1 | 7/2010  | Mowat |
| 7,793,342 | B1 | 9/2010  | Ebrahimi et al. |
| 7,810,160 | B2 | 10/2010 | Dougherty et al. |
| 7,945,779 | B2 | 5/2011  | Martin |

(Continued)

FOREIGN PATENT DOCUMENTS

EP   2 528 299 A1   11/2012

OTHER PUBLICATIONS

Acharya et al., "MPLS-based Request Routing", Jun. 10, 2001. Downloaded from the internet at: http://www.inf.fu-berlin.de/lchre/SS03/19531-V/lecture9.pdf, on Apr. 4, 2013, 9 pages.

(Continued)

*Primary Examiner* — Amir Mehrmanesh
(74) *Attorney, Agent, or Firm* — Fish & Richardson P.C.

(57) ABSTRACT

An agent on a device within a network receives a request to access a resource outside the network. A first encrypted connection is established between the device and the agent, and a second encrypted connection is established between the agent and the resource, to facilitate encrypted communication traffic between the device and the resource. The agent sends a policy request to a network appliance within the network, the request specifying the resource. The agent receives a policy response indicating that the resource is associated with one or more security policies of the network. Traffic passing between the device and the resource is selectively decrypted and inspected depending on the security policies.

12 Claims, 5 Drawing Sheets

(56) References Cited

U.S. PATENT DOCUMENTS

| | | | |
|---|---|---|---|
| 8,046,495 B2 | 10/2011 | Cooper et al. | |
| 8,225,085 B2 | 7/2012 | Karandikar | |
| 8,561,181 B1 | 10/2013 | Hernacki et al. | |
| 8,739,243 B1 | 5/2014 | Martini | |
| 2002/0065938 A1 | 5/2002 | Jungck et al. | |
| 2002/0114453 A1 | 8/2002 | Bartholet et al. | |
| 2002/0178381 A1 | 11/2002 | Lee et al. | |
| 2003/0105981 A1 | 6/2003 | Miller et al. | |
| 2003/0131259 A1 | 7/2003 | Barton et al. | |
| 2004/0015725 A1 | 1/2004 | Boneh et al. | |
| 2004/0225895 A1 | 11/2004 | Mukherjee et al. | |
| 2005/0050362 A1 | 3/2005 | Peles | |
| 2005/0149726 A1 | 7/2005 | Joshi et al. | |
| 2006/0036572 A1 | 2/2006 | Kausik | |
| 2006/0064750 A1 | 3/2006 | Kersey et al. | |
| 2006/0136724 A1 | 6/2006 | Takeshima et al. | |
| 2007/0260871 A1 | 11/2007 | Paya et al. | |
| 2008/0040790 A1 | 2/2008 | Kuo | |
| 2008/0070573 A1 | 3/2008 | Dutta et al. | |
| 2008/0082662 A1 | 4/2008 | Dandliker et al. | |
| 2008/0126794 A1 | 5/2008 | Wang et al. | |
| 2008/0128495 A1 | 6/2008 | Weintraub et al. | |
| 2008/0163333 A1 | 7/2008 | Kasralikar | |
| 2008/0215877 A1 | 9/2008 | Brabson et al. | |
| 2009/0150972 A1 | 6/2009 | Moon et al. | |
| 2009/0193513 A1 | 7/2009 | Agarwal et al. | |
| 2009/0254990 A1 | 10/2009 | McGee | |
| 2010/0138910 A1 | 6/2010 | Aldor et al. | |
| 2010/0218248 A1 | 8/2010 | Nice et al. | |
| 2010/0250754 A1 | 9/2010 | Birch et al. | |
| 2010/0313016 A1 | 12/2010 | Zhang et al. | |
| 2011/0083154 A1 | 4/2011 | Boersma | |
| 2011/0231929 A1 | 9/2011 | Rao et al. | |
| 2011/0276699 A1 | 11/2011 | Pedersen | |
| 2012/0290829 A1 | 11/2012 | Altman | |
| 2013/0094356 A1 | 4/2013 | Keith et al. | |
| 2013/0117400 A1 | 5/2013 | An et al. | |
| 2014/0143855 A1 | 5/2014 | Keoh et al. | |

OTHER PUBLICATIONS

Big-IP, "BIG-IP® Solutions Guide, Version 4.2", 2002, downloaded from the internet at http://support.f5.com/content/kb/en-us/archived_products/big-ip/manuals/product/bag42/_jcr_content/pdfAftach/download/file.res/BIG-IP_Controller_Solutions_Guide%2c_version_4.2.pdf on Apr. 4, 2013, 214 pages.

Blue Coat White Paper (How to Gain Visibility and Control of Encrypted SSL Web Sessions), 2007, downloaded from the internet at: https://www.bluecoat.com/sites/default/files/documents/files/How_to_Gain_Visibility_and_Control_of_Encrypted_SSL_Web_Sessions.a.pdf on Dec. 10, 2013, 13 pages.

Burkholder, "SSL Man-in-the-Middle Attacks," Reading Room SANS, 2002, downloaded from the internet at: http://www.sans.org/reading_room/whitepapers/threats/ssl-man-in-the-middle-attacks_480, on May 16, 2013, 17 pages.

Faruque, "Open Source Open Standard", Sep. 28, 2012, downloaded from the internet at: http://tektab.com/2012/09/28/squid-transparent-proxy-for-https-ssl-traffic/ on Apr. 26, 2013 5 pages.

Glype.com, "Glype Proxy Script", May 2, 2013, downloaded from the internet at http://www.glype.com/ on May 2, 2013, 2 pages.

Molnar, "How to set up OpenDNS for content filtering, visited sites log, etc.," Jun. 22, 2011, downloaded from the internet at: http://www.hotspotsystem.com/hotspot_help/kb/articles/113-how-to-set-up-opendns-for-content-filtering-visited-sites-log-etc on May 3, 2013 7 pages.

Murdoch, et al. "Tools and Technology of Internet Filtering," Dec. 2011, http://oni-access.net/wp-content/uploads/2011/12/accessdenied-chapter-3.pdf, May 16, 2013, 16 pages.

Nayak et al. "Different Flavours of Man-In-The-Middle Attack, Consequences and Feasible Solutions", $3^{rd}$ IEEE International Conference on Computer Science and Information Technology (ICCSIT), Jul. 9-10, 2010, pp. 491-495.

Portswigger, Ltd. "Burp Proxy Options", Apr. 26, 2013, downloaded from the internet at: http://portswigger.net/burp/help/proxy_options.html#listerners_cert on Apr. 26, 2013, 4 pages.

Portswigger, Ltd. "Getting Started with Burp Suite", Apr. 26, 2013, downloaded from the internet at: http://portswigger.et/burp/help/suite_gettingstarted.html. on Apr. 26, 2013, 4 pages.

Proxy.appspot.com, "My Proxy Server", Apr. 26, 2013, downloaded from the internet at: http://mvv-proxy.appspot.com/ on Apr. 26, 2013, 1 page.

Rousskov , "Feature: Squid-in-the-middle SSL Bump," Apr. 20, 2012, downloaded from the internet at: http://wiki.squid-cache.org/Features/SslBump on Apr. 26, 2013, 2 pages.

Ryan, "URL vs URI vs URN: The Confusion Continues", Jan. 18, 2011, downloaded from the internet at: http://damnhandy.com/2011/01/18/url-vs-uri-vs-urn-the-confusion-continues/ on Dec. 10, 2013, 7 pages.

Security Stack Exchange, "How do I check that I have direct SSL connection to a website?" May 7, 2012, download from the internet at: http://security.stackexchange.com/questions/14676/how-do-i-check-that-i-have-a-direct-ssl-connection-to-a-website on Apr. 26, 2013, 2 pages.

vonRandow, "SSL Proxying", Apr. 26, 2013, downloaded from the internet at: http://www.charlesproxy.com/documentation/proxying/ssl-proxying/ on Apr. 26, 2013, 2 pages.

Websense, Inc., "DNS Proxy Caching", 2011, downloaded from the internet at http://www.websense.com/content/support/library/web/v76/wcg_help/dns_proxy_caching.aspx on Apr. 4, 2013, 2 pages.

Wikipedia, "Proxy server", Apr. 21, 2013, downloaded from the internet at: http://en.wikipedia.org/w/index.php?title=Proxy_server&oldid=551454120 on Oct. 31, 2014, 12 pages.

International Search Report and Written Opinion issued in International Application No. PCT/US2014/034236, mailed Jul. 24, 2014, 11 pages.

International Search Report and Written Opinion issued in International Application No. PCT/US2014/037009, mailed Nov. 11, 2014, 10 pages.

International Search Report and Written Opinion issued in International Application No. PCT/US2014/51154, mailed Mar. 11, 2015, 15 pages.

SELECTIVELY PERFORMING MAN IN THE MIDDLE DECRYPTION

CROSS-REFERENCE TO RELATED APPLICATIONS

This application is a continuation application of and claims priority to U.S. application Ser. No. 14/682,019, filed on Apr. 8, 2015, which is a continuation of U.S. application Ser. No. 13/890,146, filed May 8, 2013 (now U.S. Pat. No. 9,021,575).

TECHNICAL FIELD

The present document relates to computer networking.

BACKGROUND

A computer network is a collection of computers and other hardware interconnected by communication channels that allow sharing of resources and information. Communication protocols define the rules and data formats for exchanging information in a computer network. Transport Layer Security (TLS) and Secure Socket Layer (SSL) are two examples of cryptographic communication protocols that provide communication security by allowing devices to exchange encrypted, as opposed to plaintext, messages.

SUMMARY

In one aspect, a method is performed by data processing apparatus. The method includes receiving, by an agent on a device within a network, a request to access a resource outside the network. The method further includes establishing a first encrypted connection between the device and the agent, and a second encrypted connection between the agent and the resource, to facilitate encrypted communication traffic between the device and the resource. The method further includes sending, by the agent in response to receiving the request to access the resource, a policy request to a network appliance within the network, the request specifying the resource. The method further includes receiving, by the agent and from the network appliance, a policy response indicating that the resource is associated with one or more security policies of the network. The method further includes selectively decrypting and inspecting the encrypted communication traffic passing between the device and the resource depending on the security policies.

Implementations can include any, all, or none of the following features. The device and the network appliance are subject to the same administrative control. Decrypting and inspecting the encrypted communication traffic includes blocking the encrypted communication traffic. The request to access the resource is a Hypertext Transfer Protocol (HTTP) or Hypertext Transfer Protocol Secure (HTTPS) GET or POST request. The method including receiving, by the agent, a second request to access a second resource outside the network; determining that the second recourse is on a whitelist that lists resources for which man-in-middle analysis should not apply; causing the establishment, responsive to determining that the second recourse is on the whitelist, a third encrypted connection between the device and the second resource to facilitate encrypted communication traffic between the device and the second resource. The method including removing the device from the network; receiving, by the agent, a third request to access a third resource outside the network; establishing a fourth encrypted connection between the device the agent, and a fifth encrypted connection between the agent and the third resource, to facilitate encrypted communication traffic between the device and the third resource; sending, by the agent in response to receiving the third request to access the resource, a third policy request to the network appliance, the request specifying the third resource; receiving, by the agent and from the network appliance, a third policy response indicating that the third resource is associated with one or more security policies of the network; and selectively decrypting and inspecting the encrypted communication traffic passing between the device and the third resource depending on the security policies. The agent is a driver installed in a protocol stack of the device. The agent is configured to receive requests to access resources from a plurality of applications of the device.

In one aspect, non-transitory computer storage media encoded with computer program instructions that, when executed by one or more processors, cause a computer device to perform operations. The operations include receiving, by an agent on a device within a network, a request to access a resource outside the network. The operations further include establishing a first encrypted connection between the device and the agent, and a second encrypted connection between the agent and the resource, to facilitate encrypted communication traffic between the device and the resource. The operations further include sending, by the agent in response to receiving the request to access the resource, a policy request to a network appliance within the network, the request specifying the resource. The operations further include receiving, by the agent and from the network appliance, a policy response indicating that the resource is associated with one or more security policies of the network. The operations further include selectively decrypting and inspecting the encrypted communication traffic passing between the device and the resource depending on the security policies.

Implementations can include any, all, or none of the following features. The device and the network appliance are subject to the same administrative control. Decrypting and inspecting the encrypted communication traffic includes blocking the encrypted communication traffic. The request to access the resource is a Hypertext Transfer Protocol (HTTP) or Hypertext Transfer Protocol Secure (HTTPS) GET or POST request. The operations further include receiving, by the agent, a second request to access a second resource outside the network; determining that the second recourse is on a whitelist that lists resources for which man-in-middle analysis should not apply; causing the establishment, responsive to determining that the second recourse is on the whitelist, a third encrypted connection between the device and the second resource to facilitate encrypted communication traffic between the device and the second resource. The operations further include removing the device from the network; receiving, by the agent, a third request to access a third resource outside the network; establishing a fourth encrypted connection between the device the agent, and a fifth encrypted connection between the agent and the third resource, to facilitate encrypted communication traffic between the device and the third resource; sending, by the agent in response to receiving the third request to access the resource, a third policy request to the network appliance, the request specifying the third resource; receiving, by the agent and from the network appliance, a third policy response indicating that the third resource is associated with one or more security policies of the network; and selectively decrypting and inspecting the encrypted communication traffic passing between the device and the third resource depending on the security policies. The agent is a driver installed in a protocol stack of the device. The agent is configured to receive requests to access resources from a plurality of applications of the device.

In one aspect, a system includes one or more processors configured to execute computer program instructions. The system further includes non-transitory computer storage media encoded with computer program instructions that, when executed by one or more processors, cause a computer device to perform operations. The operations include receiving, by an agent on a device within a network, a request to access a resource outside the network. The operations further include establishing a first encrypted connection between the device and the agent, and a second encrypted connection between the agent and the resource, to facilitate encrypted communication traffic between the device and the resource. The operations further include sending, by the agent in response to receiving the request to access the resource, a policy request to a network appliance within the network, the request specifying the resource. The operations further include receiving, by the agent and from the network appliance, a policy response indicating that the resource is associated with one or more security policies of the network. The operations further include selectively decrypting and inspecting the encrypted communication traffic passing between the device and the resource depending on the security policies.

Implementations can include any, all, or none of the following features. The device and the network appliance are subject to the same administrative control. Decrypting and inspecting the encrypted communication traffic includes blocking the encrypted communication traffic. The request to access the resource is a Hypertext Transfer Protocol (HTTP) or Hypertext Transfer Protocol Secure (HTTPS) GET or POST request. The operations further include, by the agent, a second request to access a second resource outside the network; determining that the second recourse is on a whitelist that lists resources for which man-in-middle analysis should not apply; causing the establishment, responsive to determining that the second recourse is on the whitelist, a third encrypted connection between the device and the second resource to facilitate encrypted communication traffic between the device and the second resource. The operations further include removing the device from the network; receiving, by the agent, a third request to access a third resource outside the network; establishing a fourth encrypted connection between the device the agent, and a fifth encrypted connection between the agent and the third resource, to facilitate encrypted communication traffic between the device and the third resource; sending, by the agent in response to receiving the third request to access the resource, a third policy request to the network appliance, the request specifying the third resource; receiving, by the agent and from the network appliance, a third policy response indicating that the third resource is associated with one or more security policies of the network; and selectively decrypting and inspecting the encrypted communication traffic passing between the device and the third resource depending on the security policies. The agent is a driver installed in a protocol stack of the device. The agent is configured to receive requests to access resources from a plurality of applications of the device.

The systems and processes described here may be used to provide any of a number of potential advantages. By performing man in the middle analysis on the device initiating encrypted traffic, the computational load needed to perform the man in the middle analysis can be handled by the initiating device. Performing the man in the middle on the device also ensures that the plaintext of the message never needs to be generated outside of the device, increasing security. An agent performing man in the middle on the device allows a network security policy to apply to the device, even when the device is not in communication with the network. If the agent is in communication with the network, up-to-date policy changes can be reflected without returning the device to the network.

DESCRIPTION OF DRAWINGS

Like reference symbols in the various drawings indicate like elements

DETAILED DESCRIPTION

When data on a network is encrypted (e.g., by SSL or TSL) the data can pose challenges to network security appliances and routines in that it makes it difficult to inspect the data as it is transferred between the end users and servers on the Internet. This can lead to problems such as viruses being transferred over secure connections and entering the network instead of being blocked because the gateway security appliances could not inspect the data. In addition, organizational policies cannot be applied since the data within the encrypted traffic is protected causing security functions to fail as they cannot inspect the data.

Described in this document is a use of man in the middle (MitM) encryption and decryption performed locally by each computer. Agents residing on each network device can intercept requests to initiate encrypted communication sessions and insert themselves as men in the middle. The agents can then pass relevant information (e.g., URL) to a policy manager in a side band channel. The policy manager may then indicate blocking or other action based on a centralized policy.

By using an agent on each computer, as opposed to a single network device performing MitM inspection for all traffic on the network, each computer handles their own encryption and decryption. This allows the number of computers to scale without creating a bottleneck on a single piece of hardware dedicated to MitM inspection.

Figure 1:
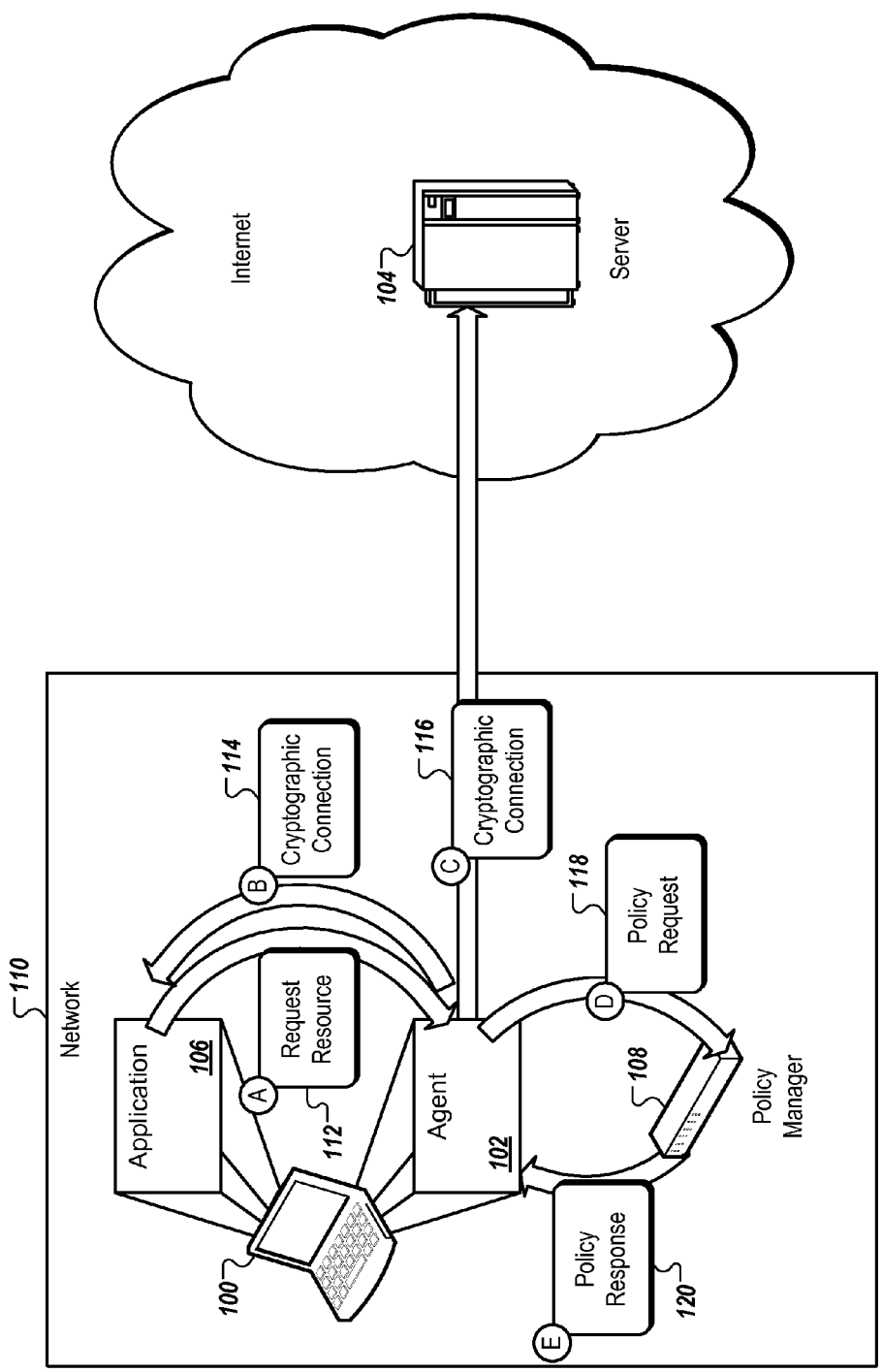
FIG. 1 is a block diagram of a computer with a man in the middle agent communicating with a remote resource.

FIG. 1 is a block diagram of a computer 100 with a man in the middle agent 102 communicating, on behalf of an application 106, with a remote resource on a server 104. The computer 100 represents any appropriate computing device capable of browsing remote resources. Also shown is a policy manager 108 on the same network 110 as the computer 100. While not shown for clarity's sake, the network 110 can include other elements including, but not limited to, wireless and/or wired access points, file and/or application servers, network gateways, routers, and network cables, as well as additional computers 100 and/or policy managers 108.

The computer 100 can be configured to route all incoming and outgoing messages through the agent 102. For example, the application 106 may generate a request 112 to access a resource on the server 104. The agent 102 can intercept the request 112 and, instead of passing the request to the server 104, can initiate a cryptographic connection 114 with the application 106 and a second cryptographic connection 116 with the server 104. By creating these two cryptographic connections 114 and 116, the agent 102 can in effect inserted itself as a MitM between the application 106 and the server 104. Future messages to be sent from the application 106 to the server 104, or vice versa, are decrypted, optionally inspected and acted upon (modified, dropped, logged), and then re-encrypted by the agent 102. In general, dropping a connection blocks the resource from the application. Modifying a request can be used to, for example, block or redirect a request. A resource can be blocked by redirecting to a website explaining that a requested resource is in violation of a security policy. A redirection can also be used to change where a resource is received from. For example, a request to a web search engine may be redirected to a different search engine that has content filters.

After creating the encrypted connections 114 and 116, the agent 102 can send a policy request 118 to the policy manager 108. The policy request 118 can specify, for example, the name, universal resource locator (URL), or other information of the resource accessed by the application 106. The policy manager can determine if there is one or more network policies associated with the network 110 that apply to the resource. The policy manager 108 can return a policy response 120 to the agent 102. The policy response 120 may include, for example, instruction on actions (e.g. modify, drop, log) to apply to communications between the application 106 and the server 104 and/or a list of the policies that apply to the resource. Based on the policy response 120, the agent 102 can take any appropriate action on the communication between the application 106 and the server 104, including no action.

Inspection, alteration, dropping, or logging of communication by the agent 102 can ensure that encrypted communication into and out of the computer 100 conforms to any number of policies. For example, the network 110 may have a policy of inspecting incoming messages for computer viruses, malware, or other unwanted content. The agent 102 may apply these policies to the encrypted traffic of the computer 100 inspecting incoming messages in their decrypted state and dropping any messages that fail the same tests as applied by the policy manager 108. In some configurations, plaintext traffic to and from the computer 100 can be inspected by the agent 102, with similar actions taken on the plaintext messages as is taken on encrypted messages. In some configurations, polices can be applied to plaintext messages when they enter or exit the network. For example, a network gateway (not shown) through which network traffic enters and exits the network 110 can examine the plaintext messages and act on the messages as specified by the policies of the network.

Although only one computer 100 is shown, additional, and different types of, computers may be on the network 110. These computers may have different hardware profiles, operating systems, and installed applications. For example, the network 110 may include a heterogeneous group of laptops, desktop computers, and mobile devices including cell phones and tablet computers. Different versions of the agent 102 may be developed and deployed on these devices, as appropriate. Each agent may be, for example, operating system specific, and may accomplish the actions described using operating system techniques. An agent for one operating system may, for example, be installed as a driver in the network stack of an operating system while an agent for another operating system may be, for example, a service that alters the firewall of the operating system.

The agent 102 may also perform other actions in addition to those already described. For example, the agent 102 may install one or more public key certificates into the computer 100. These certificates may, for example, prevent the application 106 from creating warning or error messages that indicate an unknown MitM agent is intercepting the computer's 100 communications.

Additionally or alternative, the agent 102 may store a whitelist of resources for which no MitM is to be applied. For example, the computer 100 may include a virtual private network (VPN) client used to virtually join other networks (not shown) administered by the same administrator that administrates the network 110. The agent 102 may keep a record of this VPN connection in a whitelist and, when the application 106 initiates the VPN connect, determine that the connection is on the whitelist. When such a connection is identified, the agent 102 may be configured not to intercept the connection request, allowing the connection to be made without the agent 102 acting as a MitM. The agent 102 may be configured to populate and update this whitelist from, for example, the policy manager 108.

Figure 2:
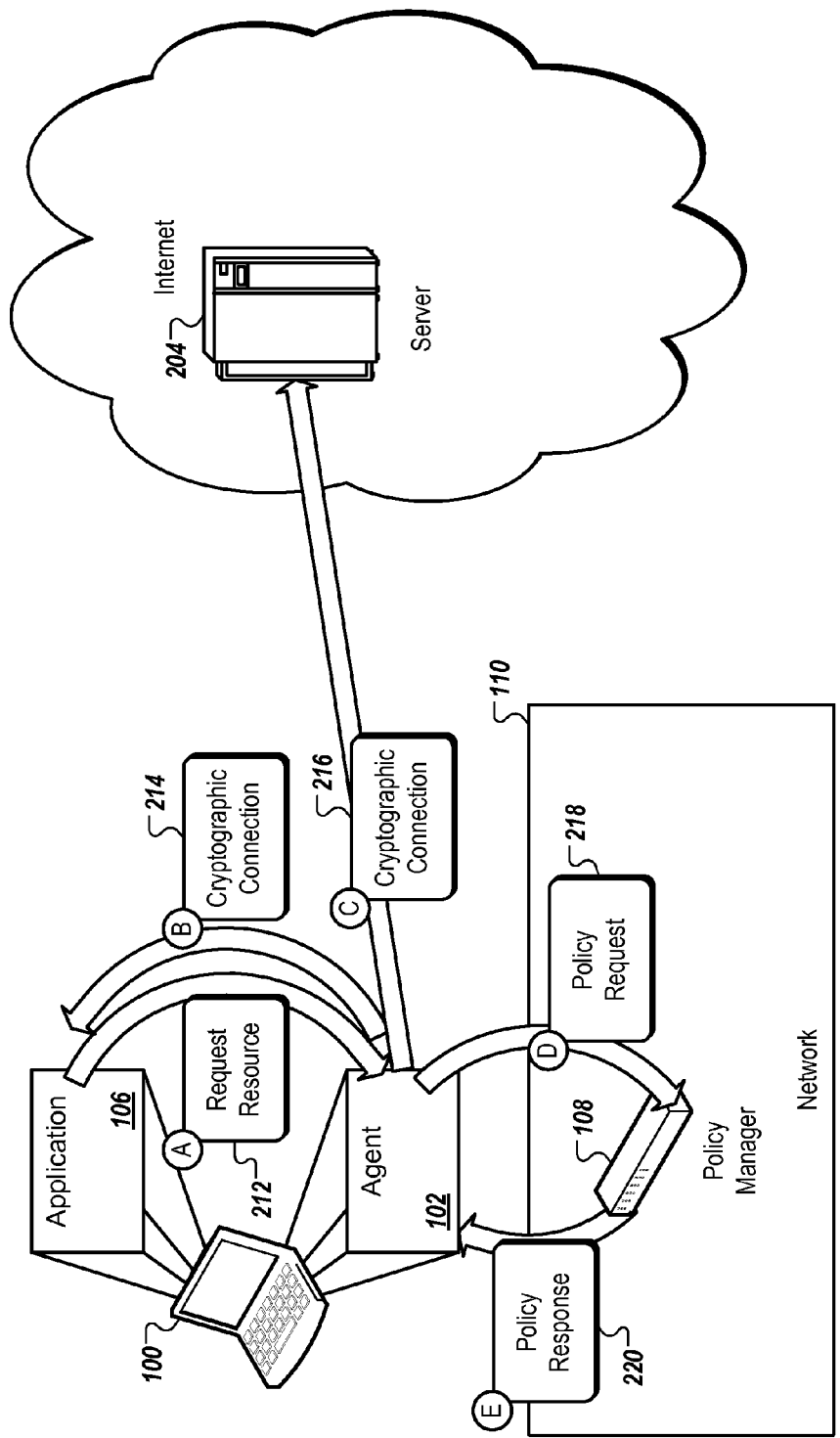
FIG. 2 is a block diagram of a man in the middle agent on a computer that has moved out of the network.

FIG. 2 is a block diagram of the man in the middle agent 102 on the computer 100 after the computer 100 has moved out of the network 110. For example, the user of the computer 100 may have, in FIG. 1, used the computer 100 on a network 110 during the day while at work or school, taken the computer 100 home, and then connected the computer 100 to the user's home network or the network of a coffee shop (not shown). As such, the computer 100 remains under the same administrative control as the network 110 and still subject to the policy determinations of the policy manager 108, even though not on the network 110.

Similar to as described with respect to FIG. 1, the application 106 can generate a request 212 to access a resource on a server 204. The agent 102 can intercept the request 212 and initiate cryptographic connections 114 and 116. Once created, the agent 102 can send a policy request 218 to the policy manager and receive a policy response 220. Based on the policy response 220, the agent 102 can perform the appropriate MitM actions on communications between the application 106 and the server 204.

In contrast with FIG. 1, in FIG. 2, the computer 100, and thus the agent 102, is not on the network 110. However, the agent 102 can still communicate with the policy manager 108, receiving up to date policy responses 220, even if a policy has changed before the computer 100 is brought back onto the network 110. Additionally, once the agent 102 has created the cryptographic connections 214 and 216, data between the computer 100 and the server 204 need not be routed through the network 110 to have the policies of the network 110 applied.

Figure 3:
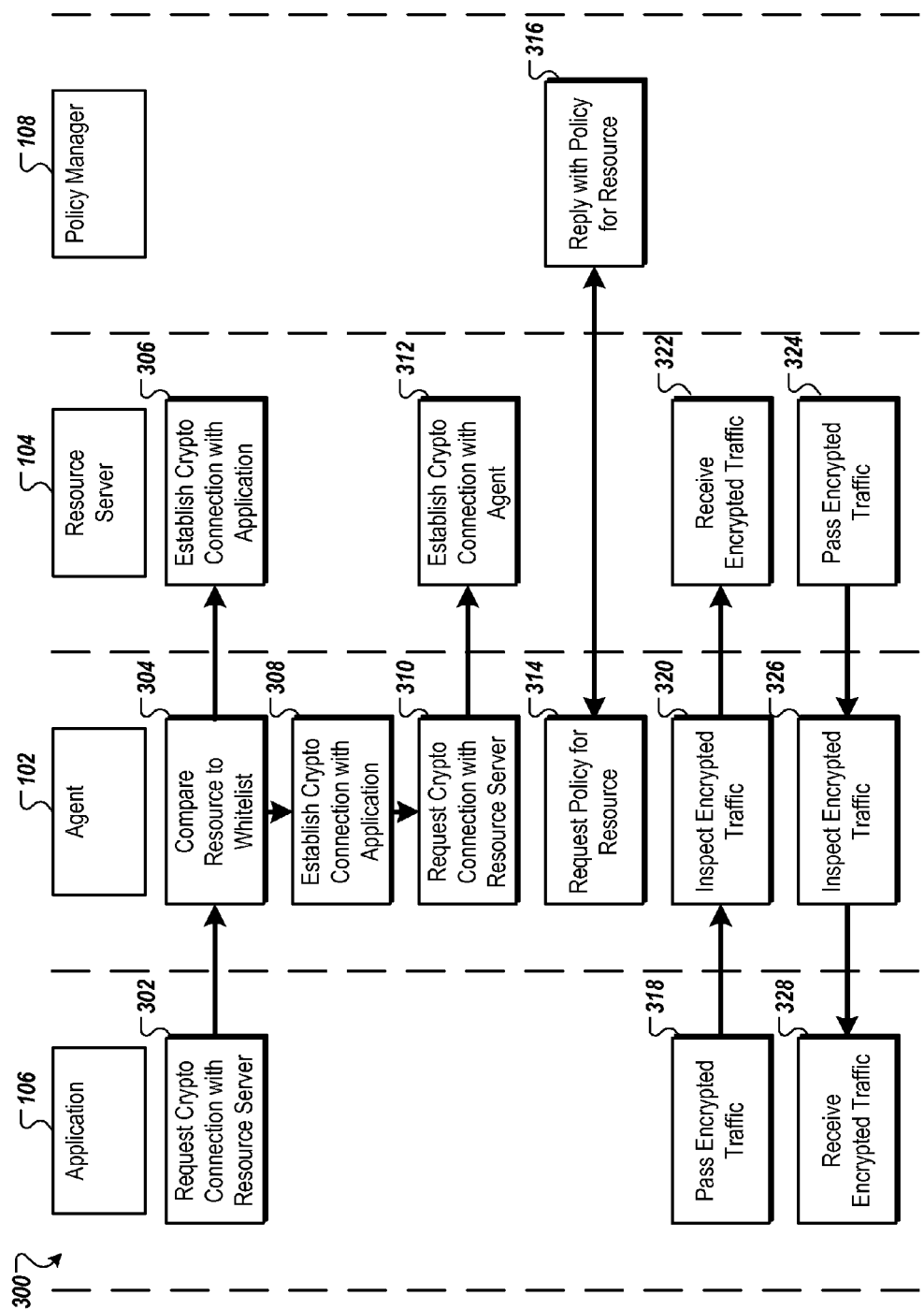
FIG. 3 is a swim-lane diagram of an example process for establishing a communication link through a man in the middle agent.

FIG. 3 is a swim-lane diagram of an example process 300 for establishing a communication link through a man in the middle agent 102. The process 300 is described with reference to the components shown in FIG. 1. However, other components, including and not limited to the components shown in FIG. 2, can be used to perform the process 300 or a similar process.

The application 106 creates a request to access a resource outside the network (302). For example, the application 106 may be a web browser, and a user may have entered a webpage to request. In another example, the application 106 may be an email client configured to request updates to a user's inbox on a regular basis. The request may take the form of any appropriate message defined by any appropriate protocol. Example messages include, but are not limited to, Hypertext Transfer Protocol (HTTP) or Hypertext Transfer Protocol Secure (HTTPS) GET or POST requests, File Transfer Protocol (FTP) RETR requests, or a TLS ClientHello message. The request may also include an identifier of the resource, such as a URL or Internet Protocol (IP) address.

The agent 102 compares the resource to a whitelist (304). The agent 102 may store a whitelist of resources identified by, for example, name, URL, or IP address. This whitelist lists resources for which the agent 102 should not perform MitM decryption and encryption. Alternatively, the agent 102 can store a blacklist of resources for which MitM decryption and encryption should be applied. If the resource is on the whitelist, or not on the blacklist, the resource server 104 establishes a cryptographic connection with the application 106 (306). Once established, the application 106 and resource server 104 can pass encrypted traffic back and forth.

If the resource is not on the whitelist, if no whitelist is used, or if the resource is on the blacklist, the agent 102 establishes a first cryptographic connection with the application 106 (308). The agent 102 requests a cryptographic connection with the resource server 104 (310) and the resource server 104 establishes the cryptographic connection with the agent 102 (312). For example, the agent 102 may act as a proxy for the resource server 104, mimicking the interface of the resource server 104 in communications with the application 106. The agent 102 may also act as a proxy for the application 106, mimicking the interface of the application 106 in communication with the resource server 104. The two encryption sessions may be of the same or different formats or types.

The agent 102 creates a policy request for the resource (102) and the policy manager 108 replies with a policy request (316). For example, once the two encrypted connections are established, the agent 102 can send information about the resource and/or the connections to the policy manager 108. The policy manager 108 can determine if one or more of the policies of the network 110 apply to the resource and or connections.

If no policies apply, the policy manager 108 can return a policy response to the agent 102 indicating that no polices apply and/or that the agent 102 should perform no or minimal MitM analysis. For example, the resource may a news website with no history of hosting malicious code. The policy manager 108 may determine that no network policies apply to the news website and return a policy response indicating as such. The agent 102 may then apply only the basic MitM analysis that is to be applied to all traffic (e.g. virus scanning).

If one or more policies do apply, the policy manager 108 can return a policy response to the agent 102 a policy response indicating that the resource is associated with one or more security policies. For example, the policy response may list the applicable polices, or the MitM actions that the agent 102 should take on the related traffic.

The application 106 generates traffic, encrypts the traffic into a first encrypted form, and passes the traffic to the agent 102 (318). For example, the application 106 can create a HTTP Get request for the data object. The application 106 can encrypt the HTTP Get request according to the requirements of the encrypted connection with the agent 102 and pass the encrypted HTTP Get request to the agent 102.

The agent 102 receives the traffic, decrypts the traffic, inspects the traffic, encrypts the traffic into a second encrypted form, and passes the traffic to the resource server 104 (320). For example, the agent 102 can decrypt the encrypted message into plaintext and determine that the message is an HTTP Get request. The agent 102 can compare the HTTP Get request with the actions or rules of policies specified by the policy response from the policy manager 108. If the HTTP Get request does not match any of the actions, the agent 102 can encrypt the HTTP Get request according to the requirements of the encrypted connection with the resource server 104 and pass the encrypted HTTP Get request to the resource server 104. If the HTTP Get request does match, the agent 102 can modify, log, or drop the request, as appropriate.

The resource server 104 receives the traffic in the second encrypted form (322). For example, the resource server 104 may receive the encrypted HTTP Get request, decrypt the HTTP Get request, and determine that the user of the application 106 has authorization to access the requested data object.

The resource server 104 generates traffic, encrypts the traffic into a third encrypted form, and passes the traffic to the agent 102 (324). For example, the resource server 104 can access the requested data object, format the data object into XML or other appropriate format, and add the XML object to an HTTP reply. The resource server 104 can encrypt the HTTP reply according to the requirements of the encrypted connection with the agent 102 and pass the encrypted HTTP reply to the agent 102

The agent 102 receives the traffic, decrypts the traffic, inspects the traffic, encrypts the traffic into a fourth form, and passes the traffic to the application 106 (326). For example, the agent 102 can decrypt the encrypted message into plaintext and determine that the message is an HTTP reply. The agent 102 can compare the HTTP reply with the actions or rules of policies specified by the policy response from the policy manager 108. If the HTTP reply does not match any of the actions, the agent 102 can encrypt the HTTP reply according to the requirements of the encrypted connection with the application 106 and pass the encrypted HTTP reply to the application 106. If the HTTP reply does violate a policy (e.g., contains malicious code, too large), the agent 102 can modify, log, or drop the reply, as appropriate. The application 106 receives the encrypted traffic (328). For example the browser device can decrypt the HTTP reply, extract the XML object, and store the XML object to disk.

Although a particular number, type, and order of operations are shown here, other numbers, types, and orders of operations are possible. For example, the agent 102 may not store a whitelist or blacklist and may never allow an encrypted connection between the application 106 and resource server 104 without MitM analysis. In some cases, the agent 102 can create and send the policy request after creating the cryptographic connections with the application 106 and the resource server 104. In other cases, the agent 102 can create and send the policy request as the cryptographic connections are being made.

Figure 4:
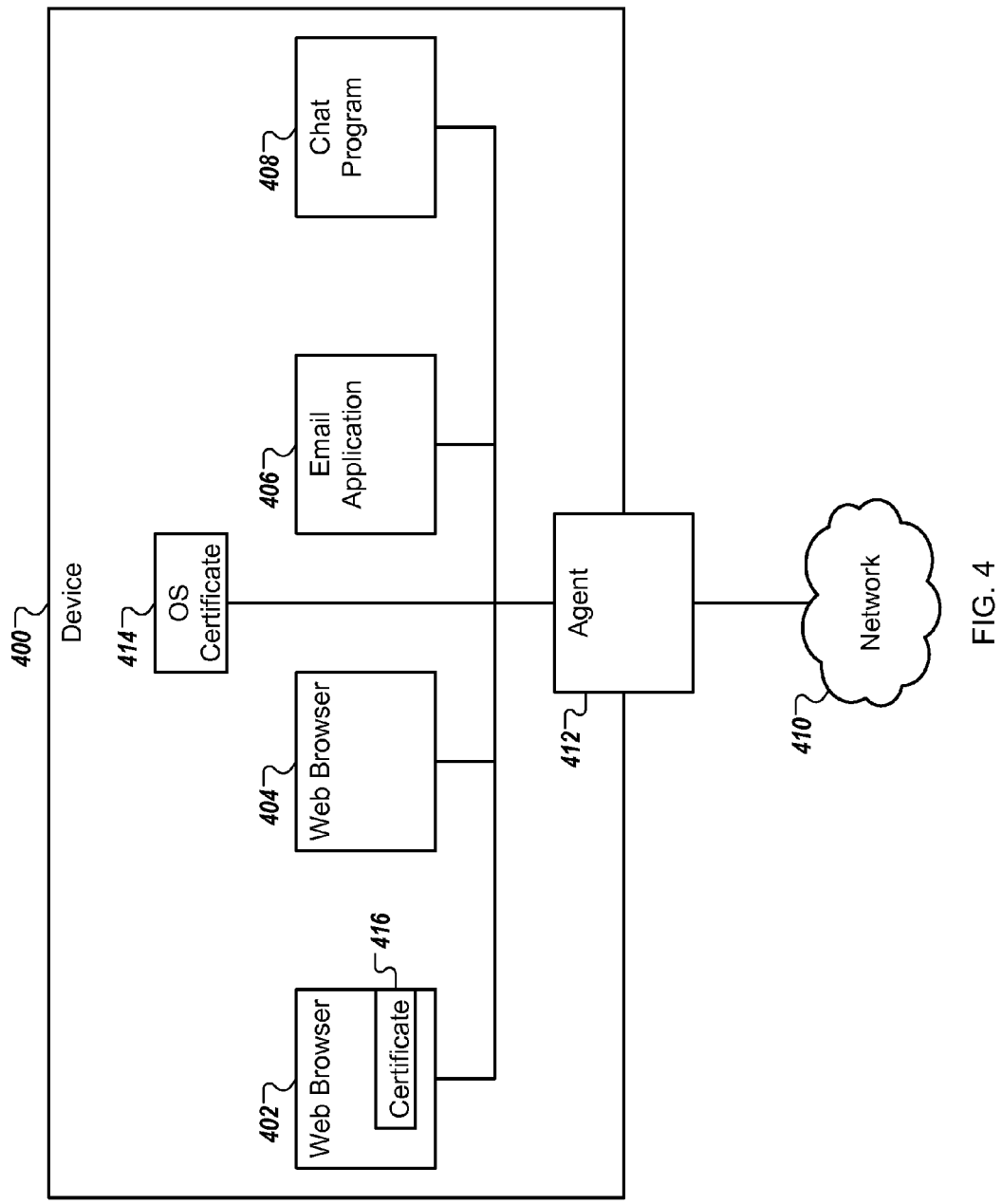
FIG. 4 is a block diagram showing a device with a man in the middle agent.

FIG. 4 is a block diagram showing a device 400 with a man in the middle agent. The device 400 may be any sort of device that can host applications that send and receive traffic from an external network. For example, the device 400 may be a personal computer, server, cell phone, tablet computer, or network appliance.

The device 400 can have installed a number of applications including, but not limited to, a web browser 402, a different web browser 404, and email application 406, and a chat program 408. The device 400, or, for example, the device's 400 operating system, can provide these application with an interface to access to an external network 410.

An agent 412 may be installed in this interface. In some cases, the agent 412 may be installed after the device 400 is manufactured. For example, the device 400 may be procured for an employee or student for use in a corporate or university setting. Before giving the device 400 to the user, a network administrator may configure the device 400 so that the device 400 meets the user's needs (e.g. has the applications 402-408 needed) and has the agent 412.

When installed and set-up, the agent 412 may install one or more certificates in the device 400 to specify that server's in the corporate or university domain are trusted. For example, the agent 412 may install an operating system certificate 414 with the operating system of the device 400. The web browser 404 and email application 406 may be configured to use the operating system's certificates, including the operating system certificate 414, when creating encrypted connections. Additionally or alternatively, the agent 412 can install certificates in application. For example, the web browser 402 may ignore the operating system's certificates and only user certificates installed with the web browser 402. In this case, the agent 412 can install a certificate 416 in the web browser 402.

Figure 5:
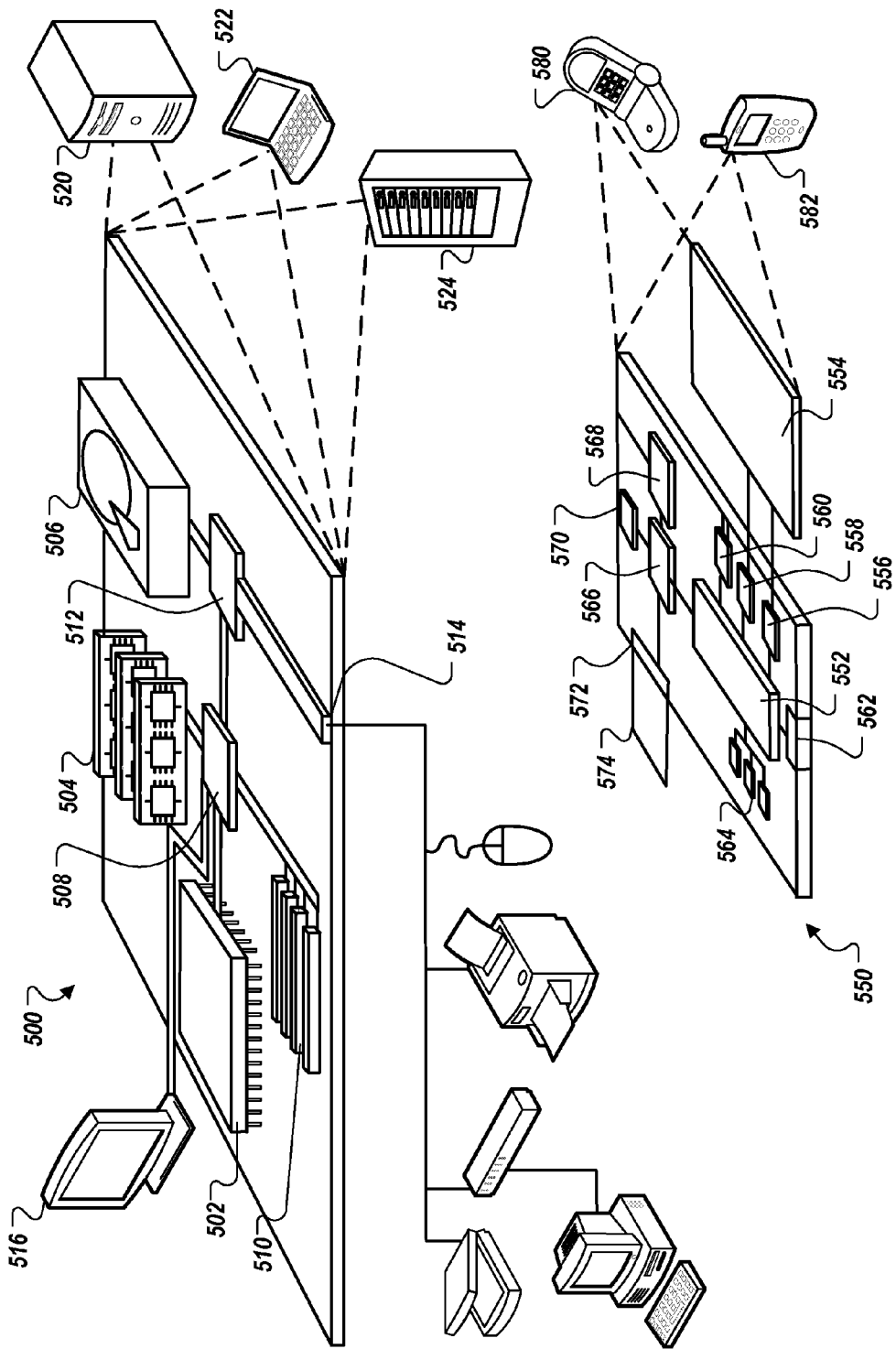
FIG. 5 is a schematic diagram that shows an example of a computing device and a mobile computing device.

FIG. 5 shows an example of a computing device 500 and an example of a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a microdrive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A device comprising:
   memory for storing machine instructions, an agent, and an operating system;
   a transceiver configured to enable the device to communicate with a policy manager on a first network, and one or more resources; and
   a processor for executing machine instructions stored in the memory, wherein execution of the machine instructions causes the device to perform operations including the following:
   alternately performing either (a) or (b) depending on whether the device is hosted on the first network or on a second network other than the first network:
      (a) if a device is hosted on a first network:
         (i) receiving, by an agent on the device, a first request to access a resource outside the first network, wherein the first request is transmitted from an operating system of the device to the agent without being transmitted outside of the device;
         (ii) transmitting, by the agent on the device, a first policy request to a policy manager hosted on the first network in response to the agent's receiving the first request, wherein the first policy request is routed from the agent on the device to the policy manager hosted on the first network without leaving the first network;
         (iii) receiving, by the agent on the device, a first policy response from the policy manager, the first policy response instructing the agent to monitor communication between the device and the resource;
         (iv) establishing, by the agent on the device, a first encrypted connection between the device's operating system and the agent such that communication traffic of the first encrypted connection is not transmitted outside the device;
         (v) establishing, by the agent on the device, a second encrypted connection between the agent on the device and the resource such that communication traffic of the second encrypted connection enters and exits the first network at a gateway of the first network; and
         (vi) monitoring, by the agent on the device, communication between the device's operating system and the resource;
         wherein monitoring, by the agent, communication between the device's operating system and the resource comprises:
         receiving, from the device's operating system, first encrypted communication traffic from the first encrypted connection;
         decrypting the first encrypted communication traffic into first decrypted communication traffic;
         inspecting the first decrypted communication traffic;
         encrypting the first decrypted communication traffic into second encrypted communication traffic; and
         transmitting, to the resource, the second encrypted communication traffic on the second encrypted connection and
      (b) alternatively, if the device is hosted on a second network other than the first network:
         (i) receiving, by the agent on the device, a second request to access the resource, wherein the request is transmitted from the operating system of the device to the agent without being transmitted outside of the device;
         (ii) transmitting, by the agent on the device, a second policy request to the policy manager hosted on the first network in response to the agent's receiving the second request, wherein the second policy request is routed from the second network to the first network in order to reach the policy manager on the first network;
         (iii) receiving, by the agent on the device, a second policy response from the policy manager, the policy response instructing the agent to monitor communication between the device and the resource;
         (iv) establishing, by the agent on the device, a third encrypted connection between the device's operating system and the agent such that communication traffic of the third encrypted connection is not transmitted outside the device;
         (v) establishing, by the agent on the device, a fourth encrypted connection between the agent and the resource such that communication traffic of the fourth encrypted connection is routed between the agent on the device and the resource without being routed to the first network; and
         (vi) monitoring, by the agent, communication between the device's operating system and the resource
         wherein monitoring, by the agent, communication between the device's operating system and the resource comprises:
         receiving, from the device's operating system, third encrypted communication traffic from the third encrypted connection;
         decrypting the third encrypted communication traffic into second decrypted communication traffic;
         inspecting the second decrypted communication traffic;
         encrypting the second decrypted communication traffic into fourth encrypted communication traffic; and
         transmitting, to the resource, the fourth encrypted communication traffic on the fourth encrypted connection.

2. The device of claim 1, the operations further comprising:
   (a) if the device is hosted on the first network:
      (vii) receiving, by the agent on the device, a third request to access a second resource outside the first network, wherein the third request is transmitted from the device's operating system to the agent without being transmitted outside of the device;
      (viii) transmitting, by the agent on the device, a third policy request to the policy manager hosted on the first network in response to the agent's receiving the third request, wherein the third policy request is routed from the agent on the device to the policy manager hosted on the first network without leaving the first network;
      (ix) receiving, by the agent on the device, a third policy response from the policy manager, the third policy response instructing the agent not to monitor communication between the device and the second resource; and (x) allowing, by the agent, the device's operating system to establish a fifth encrypted connection between the device's operating system and the second resource.

3. The device of claim 1, the operations further comprising:
(b) alternatively, if the device is hosted on a second network other than the first network:
  (vii) receiving, by the agent on the device, a fourth request to access a second resource outside the first network, wherein the fourth request is transmitted from the device's operating system to the agent without being transmitted outside of the device;
  (viii) transmitting, by the agent on the device, a fourth policy request to the policy manager hosted on the first network in response to the agent's receiving the fourth request, wherein the fourth policy request is routed from the second network to the first network in order to reach the policy manager on the first network;
  (ix) receiving, by the agent on the device, a fourth policy response from the policy manager, the fourth policy response instructing the agent not to monitor communication between the device and the second resource; and
  (x) allowing, by the agent, the device's operating system to establish a sixth encrypted connection between the device's operating system and the second resource.

4. The device of claim 1, the operations further comprising:
(a) if the device is hosted on the first network:
  wherein monitoring, by the agent, communication between the device's operating system and the resource comprises blocking at least some of the communication between the device's operating system and the resource; and
(b) alternatively, if the device is hosted on a second network other than the first network:
  wherein monitoring, by the agent, communication between the device's operating system and the resource comprises blocking at least some of the communication between the device's operating system and the resource.

5. The device of claim 1, wherein the agent is configured to receive requests from a plurality of applications running on the device's operating system.

6. The device of claim 1, wherein the agent is a driver installed in a protocol stack of the device's operating system.

7. A device comprising:
memory for storing machine instructions, an agent, and an operating system;
means for communicating with a policy manager on a first network, and one or more resources; and
a processor for executing machine instructions stored in the memory, wherein execution of the machine instructions causes the device to perform operations including the following:
  alternately performing either (a) or (b) depending on whether the device is hosted on the first network or on a second network other than the first network:
    (a) if a device is hosted on a first network:
      (i) receiving, by an agent on the device, a first request to access a resource outside the first network, wherein the first request is transmitted from an operating system of the device to the agent without being transmitted outside of the device;
      (ii) transmitting, by the agent on the device, a first policy request to a policy manager hosted on the first network in response to the agent's receiving the first request, wherein the first policy request is routed from the agent on the device to the policy manager hosted on the first network without leaving the first network;
      (iii) receiving, by the agent on the device, a first policy response from the policy manager, the first policy response instructing the agent to monitor communication between the device and the resource;
      (iv) establishing, by the agent on the device, a first encrypted connection between the device's operating system and the agent such that communication traffic of the first encrypted connection is not transmitted outside the device;
      (v) establishing, by the agent on the device, a second encrypted connection between the agent on the device and the resource such that communication traffic of the second encrypted connection enters and exits the first network at a gateway of the first network; and
      (vi) monitoring, by the agent on the device, communication between the device's operating system and the resource
      wherein monitoring, by the agent, communication between the device's operating system and the resource comprises:
        receiving, from the device's operating system, first encrypted communication traffic from the first encrypted connection;
        decrypting the first encrypted communication traffic into first decrypted communication traffic;
        inspecting the first decrypted communication traffic;
        encrypting the first decrypted communication traffic into second encrypted communication traffic; and
        transmitting, to the resource, the second encrypted communication traffic on the second encrypted connection; and
    (b) alternatively, if the device is hosted on a second network other than the first network:
      (i) receiving, by the agent on the device, a second request to access the resource, wherein the request is transmitted from the operating system of the device to the agent without being transmitted outside of the device;
      (ii) transmitting, by the agent on the device, a second policy request to the policy manager hosted on the first network in response to the agent's receiving the second request, wherein the second policy request is routed from the second network to the first network in order to reach the policy manager on the first network;
      (iii) receiving, by the agent on the device, a second policy response from the policy manager, the policy response instructing the agent to monitor communication between the device and the resource;
      (iv) establishing, by the agent on the device, a third encrypted connection between the device's operating system and the agent such that communication traffic of the third encrypted connection is not transmitted outside the device;
      (v) establishing, by the agent on the device, a fourth encrypted connection between the agent and the resource such that communication traffic of the fourth encrypted connection is routed between the agent on the device and the resource without being routed to the first network; and (vi) monitoring, by the agent, communication between the device's operating system and the resource wherein monitoring, by the agent, communication between the device's operating system and the resource comprises:

receiving, from the device's operating system, third encrypted communication traffic from the third encrypted connection;

decrypting the third encrypted communication traffic into second decrypted communication traffic;

inspecting the second decrypted communication traffic;

encrypting the second decrypted communication traffic into fourth encrypted communication traffic; and transmitting, to the resource, the fourth encrypted communication traffic on the fourth encrypted connection.

8. The device of claim 7, the operations further comprising:

(a) if the device is hosted on the first network:

(vii) receiving, by the agent on the device, a third request to access a second resource outside the first network, wherein the third request is transmitted from the device's operating system to the agent without being transmitted outside of the device;

(viii) transmitting, by the agent on the device, a third policy request to the policy manager hosted on the first network in response to the agent's receiving the third request, wherein the third policy request is routed from the agent on the device to the policy manager hosted on the first network without leaving the first network;

(ix) receiving, by the agent on the device, a third policy response from the policy manager, the third policy response instructing the agent not to monitor communication between the device and the second resource; and (x) allowing, by the agent, the device's operating system to establish a fifth encrypted connection between the device's operating system and the second resource.

9. The device of claim 7, the operations further comprising:

(b) alternatively, if the device is hosted on a second network other than the first network:

(vii) receiving, by the agent on the device, a fourth request to access a second resource outside the first network, wherein the fourth request is transmitted from the device's operating system to the agent without being transmitted outside of the device;

(viii) transmitting, by the agent on the device, a fourth policy request to the policy manager hosted on the first network in response to the agent's receiving the fourth request, wherein the fourth policy request is routed from the second network to the first network in order to reach the policy manager on the first network;

(ix) receiving, by the agent on the device, a fourth policy response from the policy manager, the fourth policy response instructing the agent not to monitor communication between the device and the second resource; and (x) allowing, by the agent, the device's operating system to establish a sixth encrypted connection between the device's operating system and the second resource.

10. The device of claim 7, the operations further comprising:

(a) if the device is hosted on the first network:

wherein monitoring, by the agent, communication between the device's operating system and the resource comprises blocking at least some of the communication between the device's operating system and the resource; and (b) alternatively, if the device is hosted on a second network other than the first network:

wherein monitoring, by the agent, communication between the device's operating system and the resource comprises blocking at least some of the communication between the device's operating system and the resource.

11. The device of claim 7, wherein the agent is configured to receive requests from a plurality of applications running on the device's operating system.

12. The device of claim 7, wherein the agent is a driver installed in a protocol stack of the device's operating system.

* * * * *